March 4, 1924.
L. TRANK
CLUTCH LEVER LOCK
Filed Aug. 5, 1921
1,486,059
2 Sheets-Sheet 1
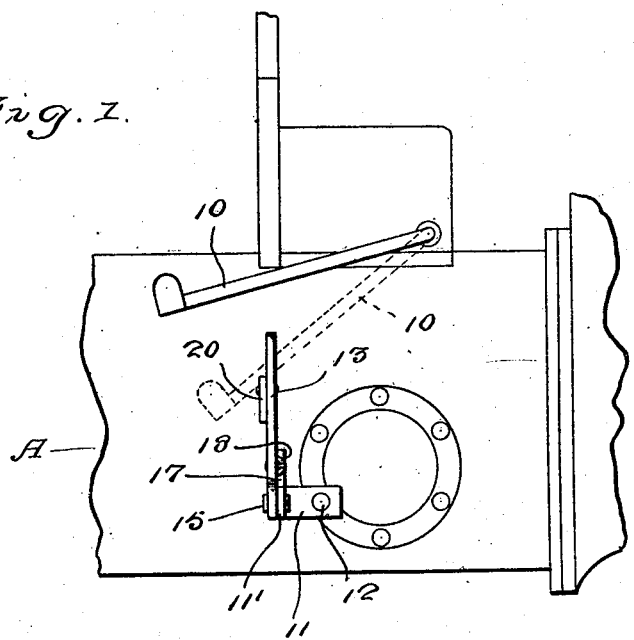
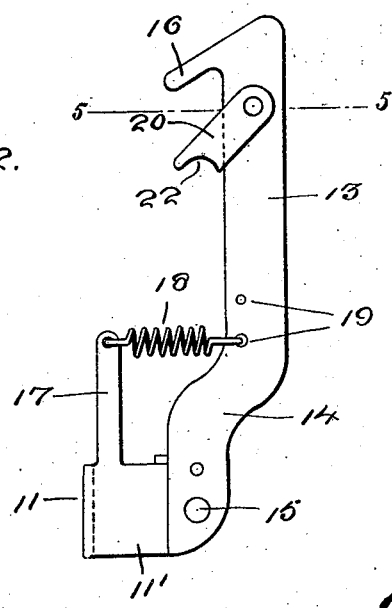
L. Trank
INVENTOR
BY Victor J. Evans
ATTORNEY March 4, 1924.
L. TRANK
CLUTCH LEVER LOCK
Filed Aug. 5, 1921    2 Sheets-Sheet 2
1,486,059
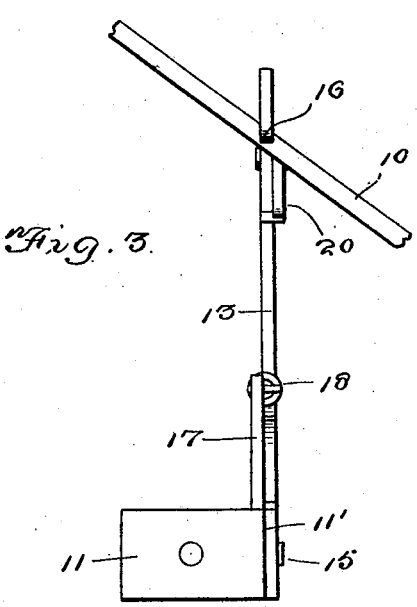
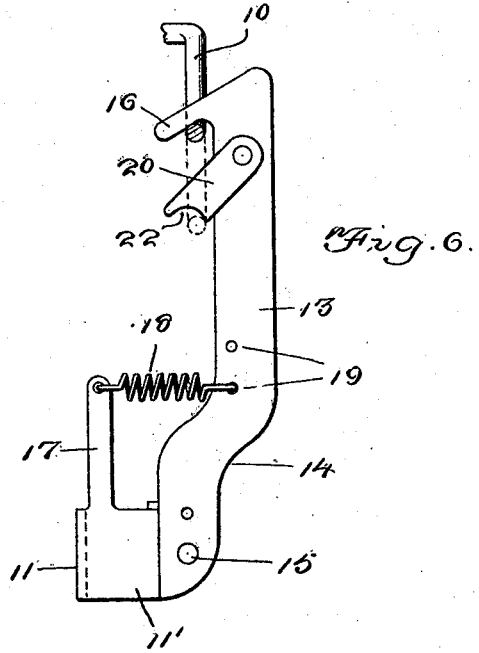
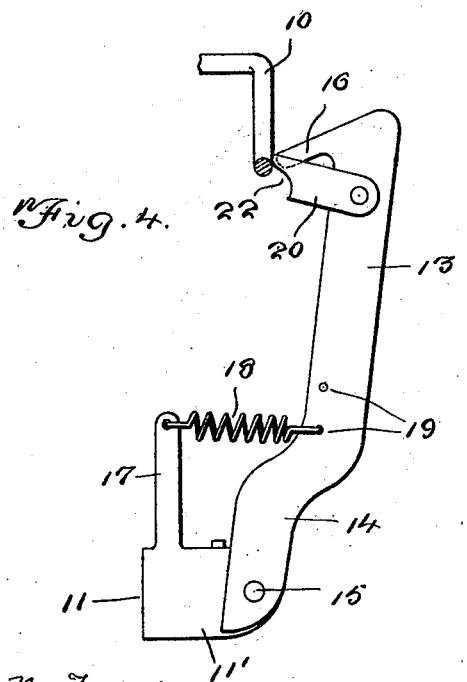
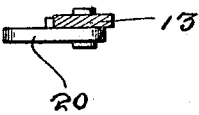
L. Trank
INVENTOR
BY Victor J. Evans
ATTORNEY
WITNESS:

Patented Mar. 4, 1924.

1,486,059

UNITED STATES PATENT OFFICE.

LEO TRANK, OF CHICO, CALIFORNIA, ASSIGNOR TO GEORGE TRANK, OF HAMILTON CITY, CALIFORNIA.

CLUTCH-LEVER LOCK.

Application filed August 5, 1921. Serial No. 490,035.

*To all whom it may concern:*

Be it known that I, LEO TRANK, a citizen of the United States, residing at Chico, in the county of Butte and State of California, have invented new and useful Improvements in Clutch-Lever Locks, of which the following is a specification.

This invention relates to tractors, and comprehends the provision of an attachment designed for use in conjunction with the clutch pedal, to automatically engage and hold the clutch disengaged, and to also effect a release of the clutch upon further depression of the clutch pedal.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:

Figure 1 is a fragmentary view of the tractor showing the position of the attachment.

Figure 2 is a side elevation of the attachment showing the normal position of the parts.

Figure 3 is a view, showing the manner of holding the clutch disengaged.

Figure 4 is a view showing the position of the parts just prior to the release of the clutch.

Figure 5 is a sectional view taken on line 5—5 of Figure 2.

Figure 6 is a view somewhat similar to Figure 2, showing the attachment associated with the clutch pedal.

Referring to the drawings in detail, A indicates a portion of a tractor of well-known construction, and wherein 10 indicates the clutch pedal.

The attachment forming the subject matter of the present invention embodies a bracket of substantially L-shaped formation which is arranged adjacent the clutch pedal 10, and the branch 11 of which is secured to the tractor by means of a fastening element 12. The remaining branch 11' of the bracket supports what I term the clutch locking lever 13 which is arranged at right angles to the branch 11 and this lever is slightly offset at one end as at 14, and this offset extremity is pivoted as at 15 upon the branch 11' of the bracket. The lever 13 is vertically disposed and terminates at its upper end to provide a downwardly inclined hook-like portion 16 for a purpose to be hereinafter described.

Rising from the branch 11' of the bracket is an extension 17 to which one end of a coiled spring 18 is connected, the opposite end of this spring being suitably secured to the lever 13. This lever is preferably provided with a plurality of openings 19 so that the adjacent end of the spring can be conveniently connected with the lever at different points so that the tension of the spring can be regulated.

Pivoted upon the lever 13 is a comparatively small lever 20, which will be hereinafter known as the clutch release lever, this lever being pivoted adjacent the hook-like extremity of the lever 13. The free end of the lever 20 is partially bifurcated as at 22 for a purpose hereinafter described. The spring 18 holds the lever 13 in juxta-position to the clutch pedal 10, with the hook-like extremity 16 extended in a direction of the said pedal, while the normal position of the clutch release lever is that shown in Figure 2, wherein the lever is arranged to extend downwardly from its pivot point.

In practice, when the pedal 10 is depressed to disengage the clutch, the pedal is moved to a position where it is engaged by the hook-like extremity 16 of the lever 13, the latter serving to lock or hold the pedal in this position with the clutch disengaged. Upon further depression of the pedal 10, the lever 13 is swung upon its pivot against the tension of the spring 18, until it occupies a position wherein the clutch release lever engages the pedal 10, or in other words receives the pedal 10 in its bifurcated extremity. When the pedal is released, the clutch in returning to its normal position, moves the lever 20 upon its pivot to the position illustrated in Figure 4, in which position the clutch pedal moves out of engagement from the attachment, which allows the clutch to assume its normal or active position. The hook-like extremity 16 of the lever 13 is inclined as shown so as to automatically engage the pedal 10 when the latter is depressed, while the spring 18 functions to hold the attachment associated with the pedal. The attachment is very simple in construction, can be manufactured and sold at a very nominal cost, and can also be quickly applied to any make of tractor.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. A tractor attachment comprising a bracket adapted to be secured to the tractor, a lever pivoted upon the bracket and arranged in juxta-position to the clutch pedal, a downwardly inclined hook-like portion constituting one terminal of the lever and adapted to engage the said pedal when the latter is depressed and hold the clutch disengaged, and a partially bifurcated lever pivotally secured to said first mentioned lever adjacent the hook like extremity for engaging and releasing said pedal upon further depression of the latter.

2. A tractor attachment of the character described comprising a substantially L-shaped bracket secured to the tractor adjacent the clutch pedal thereof, an apertured extension rising from the free branch of the bracket, a clutch locking lever pivotally secured to this mentioned branch and being offset intermediate its ends, said lever being provided with a plurality of openings arranged to cooperate with the aperture of the extension, a coil spring having one end received in the aperture of the extension and its opposite end associated with either of the openings whereby the tension of said springs may be regulated, a downwardly inclined hook like portion formed on the upper end of said lever for engagement with said clutch pedal and a clutch release lever pivotally secured to the clutch locking lever adjacent the hook like portion and being provided with a partially bifurcated extremity for the purpose specified.

In testimony whereof I affix my signature.

LEO TRANK.